United States Patent
Yamasue et al.

(10) Patent No.: US 9,790,066 B2
(45) Date of Patent: Oct. 17, 2017

(54) ROTATING SHAFT LIFTING JIG AND ROTATING SHAFT LIFTING METHOD

(71) Applicant: MITSUBISHI HITACHI POWER SYSTEMS, LTD., Kanagawa (JP)

(72) Inventors: Shingo Yamasue, Tokyo (JP); Masahito Kataoka, Tokyo (JP); Hitoshi Morimoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 4 days.

(21) Appl. No.: 14/780,254

(22) PCT Filed: Jun. 9, 2014

(86) PCT No.: PCT/JP2014/065229
§ 371 (c)(1),
(2) Date: Sep. 25, 2015

(87) PCT Pub. No.: WO2014/199951
PCT Pub. Date: Dec. 18, 2014

(65) Prior Publication Data
US 2016/0052756 A1    Feb. 25, 2016

(30) Foreign Application Priority Data

Jun. 12, 2013  (JP) ................. 2013-123941

(51) Int. Cl.
*B66F 3/00*   (2006.01)
*B66F 3/24*   (2006.01)
(Continued)

(52) U.S. Cl.
CPC ............. *B66F 3/24* (2013.01); *B66F 17/00* (2013.01); *F01D 25/285* (2013.01); *F16C 17/24* (2013.01);
(Continued)

(58) Field of Classification Search
CPC .. B66F 3/24; B66F 17/00; B66F 17/03; B66F 17/24; F01D 25/285; F16C 2237/00; F16C 41/04
See application file for complete search history.

(56) References Cited

U.S. PATENT DOCUMENTS 4,295,257 A * 10/1981 Strohs ............... B23P 19/04
                                                             269/43
5,181,821 A *  1/1993 King, Sr. ........... B60T 17/221
                                                            254/133 R
(Continued)

FOREIGN PATENT DOCUMENTS

CN     102094685     6/2011
CN     203439996     2/2014
(Continued)

OTHER PUBLICATIONS

First Office Action dated Feb. 29, 2016 in corresponding Chinese Application No. 201480019365.7 (with English translation).
(Continued)

*Primary Examiner* — Larry E Waggle, Jr.
*Assistant Examiner* — Nirvana Deonauth
(74) *Attorney, Agent, or Firm* — Wenderoth, Lind & Ponack, L.L.P.

(57) ABSTRACT

A rotating shaft lifting jig is inserted between a rotating shaft of a rotary machine and a bearing stand surrounding the outer periphery of at least a lower part of the rotating shaft. The jig for lifting the rotating shaft includes: a pedestal which is supported on an inner peripheral surface of the bearing stand; and a jack part which is disposed between the pedestal and the outer peripheral surface of the rotating shaft and extends/contracts in the radial direction. The radial dimension of the pedestal is smaller than a radial clearance between the rotating shaft and the bearing stand. A rotor receiver having a cylindrical surface conforming to the outer
(Continued)

peripheral surface of the rotating shaft is provided between the jack part and the rotating shaft. The rotor receiver is provided with a plurality of support members in directions different from the direction of the jack part.

20 Claims, 5 Drawing Sheets

(51) Int. Cl.
*F16C 41/04* (2006.01)
*F16C 17/24* (2006.01)
*F01D 25/28* (2006.01)
*B66F 17/00* (2006.01)
*F16C 17/03* (2006.01)

(52) U.S. Cl.
CPC .............. *F16C 41/04* (2013.01); *F16C 17/03* (2013.01); *F16C 2237/00* (2013.01); *F16C 2360/23* (2013.01)

(56) References Cited

U.S. PATENT DOCUMENTS

| | | | | |
|---|---|---|---|---|
| 7,624,488 | B2* | 12/2009 | Lum ......................... | B25B 5/14 269/287 |
| 2001/0040179 | A1* | 11/2001 | Tochigi ................ | B23K 20/126 228/2.1 |
| 2014/0001335 | A1* | 1/2014 | Hurst ...................... | F01D 25/28 248/674 |
| 2014/0250916 | A1* | 9/2014 | Cabeen ..................... | F02C 7/20 60/797 |

FOREIGN PATENT DOCUMENTS

| | | |
|---|---|---|
| DE | 2 410 830 | 9/1974 |
| GB | 2 099 923 | 12/1982 |
| JP | 39-8488 | 5/1964 |
| JP | 49-3436 | 1/1974 |
| JP | 50-2662 | 1/1975 |
| JP | 53-51349 | 5/1978 |
| JP | 58-007800 | 1/1983 |
| JP | 58-7800 | 2/1983 |
| JP | 60-237224 | 11/1985 |
| JP | 61-54846 | 3/1986 |
| JP | 4-52614 | 5/1992 |
| JP | 04-122585 | 11/1992 |
| JP | 05-256105 | 10/1993 |
| JP | 2504127 | 7/1996 |
| JP | 2011-21541 | 2/2011 |
| JP | 2012-62872 | 3/2012 |
| TW | M451359 | 4/2013 |

OTHER PUBLICATIONS

International Search Report dated Aug. 26, 2014 in corresponding International Application No. PCT/JP2014/065229 (with English translation).
Written Opinion of the International Searching Authority dated Aug. 26, 2014 in corresponding International Application No. PCT/JP2014/065229 (with English translation).
Office Action dated May 20, 2016 in corresponding Taiwanese Application No. 103122494 (with English translation of Search Report).
Extended European Search Report dated Jan. 16, 2017 in corresponding European Application No. 14810235.3.

* cited by examiner

ROTATING SHAFT LIFTING JIG AND ROTATING SHAFT LIFTING METHOD

BACKGROUND OF THE INVENTION

1. Technical Field

The present invention relates to a rotating shaft lifting jig which is used when lifting a rotating shaft of a rotary machine, for example, a turbine etc., and to a rotating shaft lifting method.

This application claims priority to Japanese Patent Application No. 2013-123941 filed on Jun. 12, 2013, the contents of which are incorporated herein by reference.

2. Description of the Related Art

Conventionally, a journal (tilting pad) bearing is used in large-size rotary machines such as steam turbines and gas turbines for rotatably supporting the rotor. When replacing or dismounting the journal bearing, it is necessary to remove loads applied to the lower half part of the journal bearing by hoisting or jacking up a rotor shaft which is composed of a rotor, a plurality of blades, etc.

Known methods for jacking up a rotor include a method as described in Japanese Utility Model Laid-Open No. S58-7800, which uses two hydraulic jacks and a V-block disposed between these hydraulic jacks and a rotor. A pedestal, which supports the two hydraulic jacks used in this jack-up method, is provided with support bolts. These support bolts serve as a safety device for supporting the V-block in case of a defect occurring in the hydraulic jacks.

SUMMARY OF THE INVENTION

1. Technical Problem

The conventional jack-up method described above requires two hydraulic jacks. Moreover, the conventional jack-up method have a problem in that the operation becomes complicated due to the two hydraulic jacks to be operated for jacking up a rotor.

An object of the present invention is to provide a rotating shaft lifting jig and a rotating shaft lifting method which allow a rotating shaft of a rotary machine to be lifted by a simple operation.

2. Solution to the Problem

According to a first aspect of the present invention, there is provided a rotating shaft lifting jig which is inserted between a rotating shaft of a rotary machine and a bearing stand surrounding the outer periphery of at least a lower part of the rotating shaft, the rotating shaft lifting jig including: a pedestal which is supported on the inner peripheral surface of the bearing stand under the rotating shaft; a rotor receiver of which the inner peripheral surface is formed so as to conform to the outer peripheral surface of the rotating shaft, and which covers the outer periphery of the rotating shaft on the lower side; a jack part which is disposed between the pedestal and the rotor receiver, and extends/contracts in the radial direction of the rotating shaft to move the rotating shaft, along with the rotor receiver, in an extension/contraction direction; and a plurality of support members which support the rotor receiver against the bearing stand from directions different from the extension/contraction direction and different from one another.

According to this configuration, it is possible to configure a rotating shaft lifting jig, including a backup structure for fall prevention during jack-up, in a simplified configuration. Since a single jack part is used, the work efficiency during jack-up can also be improved.

In the above-described rotating shaft lifting jig, the extension/contraction direction of the jack part may be the vertical direction, and the plurality of support members may be disposed across the jack part.

According to this configuration, it is possible to stably support the rotor receiver for fall prevention during jack-up.

In the above-described rotating shaft lifting jig, the pedestal may have an outer peripheral surface conforming to the inner peripheral surface of the bearing stand.

According to this configuration, it is possible to stably support the pedestal by the bearing stand.

In the above-described rotating shaft lifting jig, the bearing stand may be provided with an opening at the bottom, and the pedestal may be provided with a protrusion which engages with the opening.

According to this configuration, the stability of the pedestal can be enhanced.

According to a second aspect of the present invention, there is provided a rotating shaft lifting method for lifting a rotating shaft of a rotary machine by means of a jig which is inserted between the rotating shaft and a bearing stand surrounding the outer periphery of at least a lower part of the rotating shaft, the rotating shaft lifting method including the steps of: fixing a pedestal, of which the radial dimension is smaller than a radial clearance between the rotating shaft and the bearing stand, between the rotating shaft and the bearing stand so as to be supported on the bearing stand; mounting a jack part, which extends/contracts in the radial direction and lifts the rotating shaft from below, on the pedestal; mounting a rotor receiver, which has a cylindrical surface conforming to the outer peripheral surface of the rotating shaft, between the jack part and the rotating shaft; providing the rotor receiver with a plurality of support members in directions different from the direction of the jack part; and activating the jack part.

3. Advantageous Effects of the Invention

According to the present invention, it is possible to configure a rotating shaft lifting jig, including a backup structure for fall prevention during jack-up, in a simplified configuration.

DETAILED DESCRIPTION OF THE INVENTION

In the following, an embodiment of the present invention will be described in detail with reference to the drawings.

A rotating shaft lifting jig 1 (hereinafter referred to simply as the jig 1) of this embodiment is the jig 1 which is inserted between a rotor 54 of a gas turbine 50 being a rotary machine and the lower half part of a bearing stand 2 (hereinafter referred to simply as the bearing stand 2).

Figure 1:
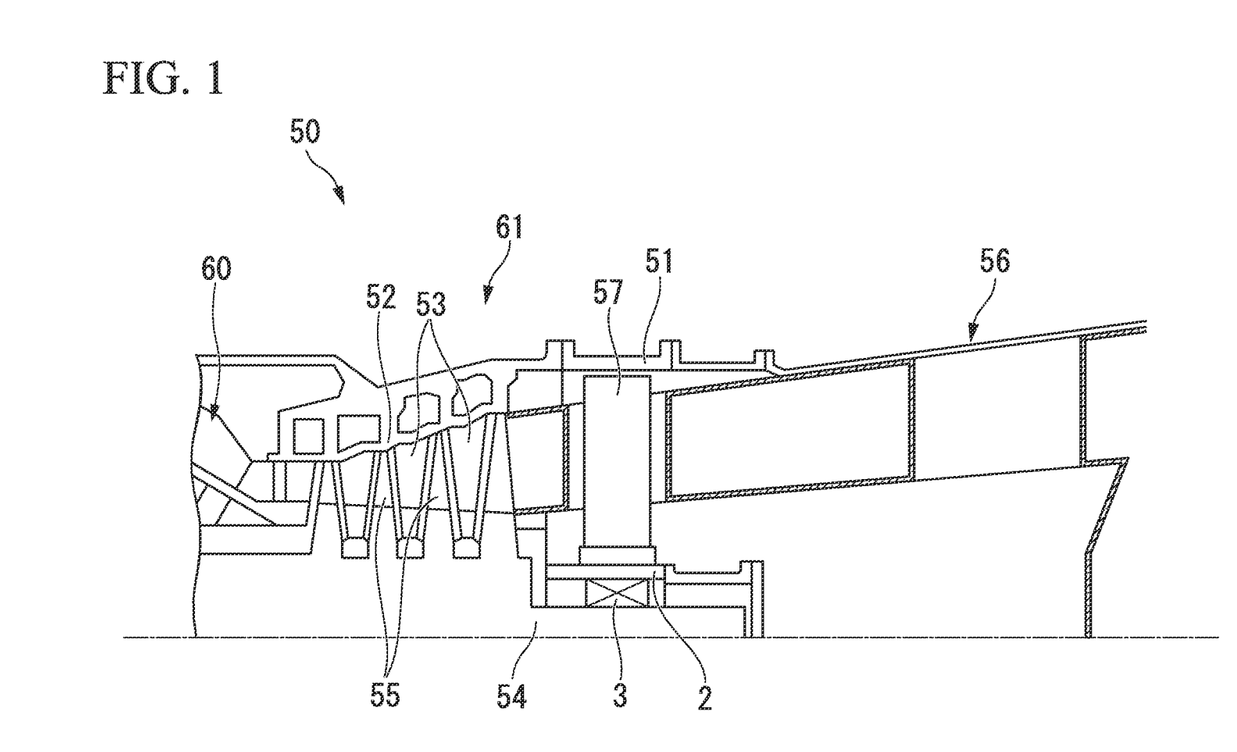
FIG. 1 is a cross-sectional view of a gas turbine of an embodiment of the present invention.

As shown in FIG. 1, the gas turbine 50 includes a casing 51 on the outer side, and a plurality of stages of a combination of vanes 53 fixed on a stator 52 and blades 55 fixed on the rotor 54 are disposed inside the casing 51. In the gas turbine 50, a working fluid such as combustion gas, after activating a turbine 61, passes through a diffuser 56 provided on the downstream side in the flow of the fluid and is then sent out to a device etc.

The rear end of the rotor 54 is supported by a journal bearing 3 housed in the bearing stand 2. The bearing stand 2 is supported by a plurality of struts 57 which are disposed radially around the rotor 54 so as to extend across the flow of the working fluid.

The bearing stand 2 is provided so as to surround the rotor 54. More specifically, the bearing stand 2 is provided so as to cover an end portion of the rotor 54 on the downstream side of the turbine. The inside of the bearing stand 2 serves as an oil flow passage during operation of the gas turbine 50.

Figure 2:
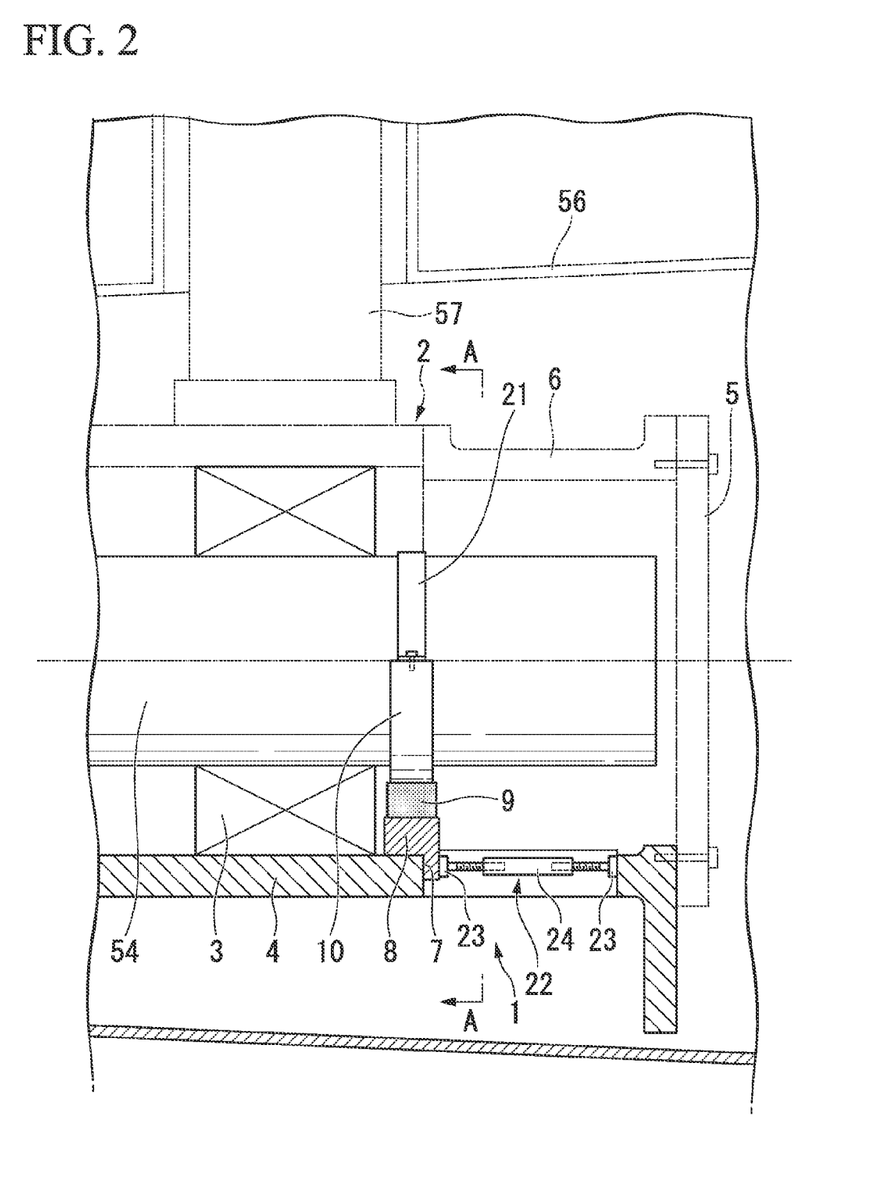
FIG. 2 is a cross-sectional view showing around a journal bearing of the gas turbine of the embodiment of the present invention.
Figure 3:
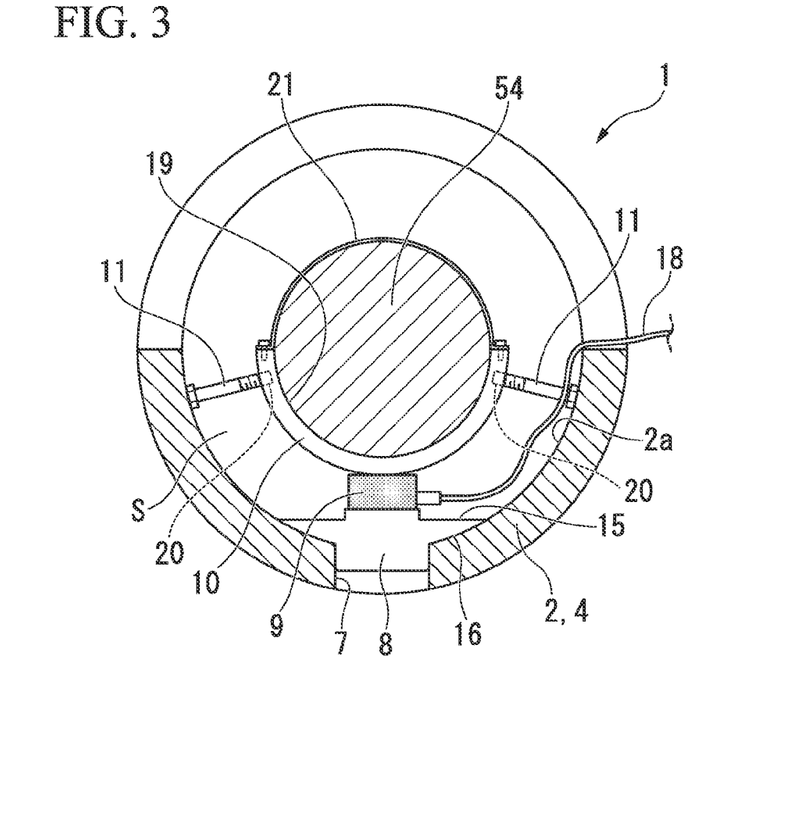
FIG. 3 is a view in the direction of the arrow A of FIG. 2.

As shown in FIG. 2 and FIG. 3, the bearing stand 2 has a bearing stand main body part 4 having a cylindrical shape concentric with the rotor 54, and a disc-shaped bearing stand sealing part 5 provided so as to seal an end portion of the bearing stand main body part 4. The jig 1 of this embodiment is used after the bearing stand sealing part 5, the upper half part of the diffuser 56, the struts 57 on the upper half side, and the upper half part of the bearing stand 2 are removed. In FIG. 2, these components are therefore indicated by the two-dot chain lines.

An inner peripheral surface 2a of at least the lower half part of the bearing stand 2 is a cylindrical surface concentric with the rotor 54. Between the rotor 54 and the bearing stand 2, a clearance S is formed which corresponds to the radial thickness of the journal bearing 3.

A portion of the upper half part of the bearing stand main body part 4 on the end portion side is removable as a bearing cover part 6. Since the jig 1 of this embodiment is used after the bearing cover part 6 is removed, the bearing cover part 6 is indicated by the two-dot chain lines in FIG. 2.

An oil drain port 7, which is an opening of a rectangular shape in a plan view, is formed in a lower part of the bearing stand main body part 4 on the end portion side. The oil drain port 7 is formed between a mounting place of the journal bearing 3 and the end portion of the bearing stand main body part 4.

Next, details of the jig 1 will be described. The jig 1 is used by being inserted into the clearance S between the rotor 54 of the turbine 61 and the lower half part of the bearing stand 2 which surrounds the outer periphery of at least a lower part of the rotor 54.

The jig 1 has a pedestal 8 supported on the inner peripheral surface 2a of the bearing stand 2, a jack part 9 which is provided between this pedestal 8 and the outer peripheral surface of the rotor 54 and extends/contracts in the radial direction, a rotor receiver 10 disposed between the jack part 9 and the rotor 54, and a plurality of support members 11 for supporting the rotor receiver 10. The extension/contraction direction of the jack part 9 of this embodiment is the vertical direction.

The support members 11 are members functioning as a backup structure for fall prevention during jack-up. That is, the rotor 54 is moved by the jack part 9, along with the rotor receiver 10, in the extension/contraction direction of the jack part 9.

The jig 1 is used in a configuration where the pedestal 8 is disposed on the bearing stand 2, the rotor receiver 10 is disposed in close contact with the rotor 54, and the jack part 9 is disposed between the pedestal 8 and the rotor receiver 10.

Figure 4:
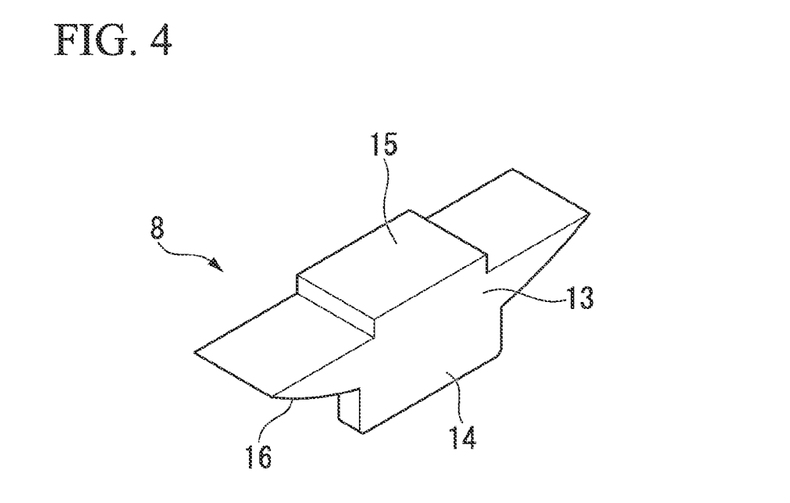
FIG. 4 is a perspective view showing a pedestal of the embodiment of the present invention.

As shown in FIG. 4, the pedestal 8 has a pedestal main body part 13 which is placed on the inner peripheral surface 2a of the bearing stand 2, and a protrusion 14 projecting downward from the pedestal main body part 13. The pedestal main body part 13 has a shape of a block with a flat jack mounting surface 15 and a curved seating surface 16 which is formed of a curved surface having a part of a cylindrical surface conforming to the inner peripheral surface 2a of the bearing stand 2.

The curved seating surface 16 has a curvature which allows it to come into surface contact with the inner peripheral surface 2a of the bearing stand 2.

The protrusion 14 is a portion which projects from the curved seating surface 16 in a direction opposite from the jack mounting surface 15, and the width of the protrusion 14 seen from the axial direction of the curved seating surface 16 is substantially equal to or slightly smaller than the width of the oil drain port 7 of the bearing stand 2. More specifically, the protrusion 14 is formed so that it can engage with the oil drain port 7.

The height of the pedestal 8, namely, the distance between the jack mounting surface 15 and an end portion of the protrusion 14, is smaller than the clearance between the rotor 54 and the inner peripheral surface 2a of the bearing stand 2. In other words, the pedestal 8 has such a size that it can be inserted between the rotor 54 and the bearing stand 2.

The jack part 9 is a weight-lifting hydraulic cylinder of a flat type having a short overall height, and includes a hydraulic hose 18 connected with a hydraulic supply unit (not shown). The output and the stroke of the jack part 9 are selected appropriately according to the weight of the rotor shaft (rotor) etc. of the turbine for which the jack part 9 is used.

The rotor receiver 10 is a semi-annular member which covers the outer periphery of the rotor 54 on the lower side in close contact with the rotor 54. The rotor receiver 10 is a member which supports the rotor 54 in close contact with the rotor 54, and is used while being supported by the plurality of support members 11.

The support members 11 are members which support the rotor receiver 10 by being interposed between the rotor receiver 10 and the bearing stand 2. The support members 11 in this embodiment are hexagon bolts which are screw-engaged with screw holes 20 formed in the rotor receiver 10. The support members 11 are disposed such that the heads of the hexagon bolts are butted against the inner peripheral surface 2a of the bearing stand 2.

The rotor receiver 10 has a cylindrical surface 19 conforming to the outer peripheral surface of the rotor 54, and the plurality of screw holes 20 in which the support members 11 can be fixed. The cylindrical surface 19 has a shape which allows it to be butted against a portion of the lower half part of the rotor in substantially close contact with each other. The screw holes 20 are female screw holes formed from the outer peripheral surface of the rotor receiver 10 toward the center of curvature of the rotor receiver 10. The screw holes 20 are formed in the vicinity of both ends of the semi-annular rotor receiver 10.

More specifically, the female screw holes are formed at such positions that the longitudinal directions of the support members 11 are oriented in directions which extend along the radial direction of the rotor 54 and slightly downward from the horizontal direction. In other words, the plurality of support members 11 support the rotor receiver 10 against the bearing stand 2 from directions which are different from the extension/contraction direction of the jack part 9 and different from one another. The two support members 11 of this embodiment are disposed symmetrically across the jack part 9.

In this embodiment, the "directions which are different from the extension/contraction direction of the jack part 9" mean directions which are the radial direction of the rotor 54 and different from the extension/contraction direction of the jack part 9.

A fall prevention plate 21 for preventing fall of the rotor 54 can be mounted on the rotor receiver 10. The fall prevention plate 21 is a long sheet-like member which can be curved so as to follow the contour of the upper half part of the rotor 54, and is used with its both ends fastened with screws on the horizontal surfaces of the rotor receiver 10.

In a state where the rotor receiver 10, the jack part 9, and the pedestal 8 are in place, the entire dimension from the curved seating surface 16 of the pedestal 8 to the cylindrical surface 19 of the rotor receiver 10 is smaller than the radial dimension of the clearance S. To be more specific, the difference between the entire dimension and the radial dimension of the clearance S is smaller than the stroke of the jack part 9.

The jig 1 of this embodiment has a turnbuckle 22 for fixing the pedestal 8. The turnbuckle 22 is a rod-like member having a pair of butting parts 23 at both ends, and the distance between the pair of butting parts 23 is adjustable. More specifically, the turnbuckle 22 has a columnar turnbuckle main body part 24, and the pair of butting parts 23 having a threaded shaft which is screw-engaged with a pair of screw holes formed in both end surfaces of the turnbuckle main body part 24. Instead of the turnbuckle 22, another hydraulic cylinder may be used to fix the pedestal 8, and if a hydraulic cylinder is used, the pedestal 8 can be fixed more easily.

Next, a method for lifting the rotor 54 by means of the jig 1 of this embodiment will be described.

First, the bearing stand sealing part 5 and the bearing cover part 6 are removed so that a worker can access the rotor 54.

Figure 5:
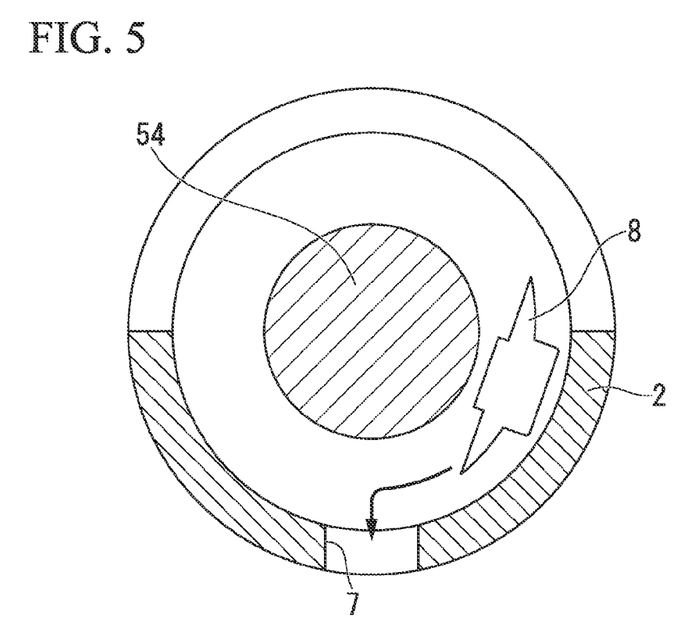
FIG. 5 is a view illustrating a rotor lifting method by means of a jig of the embodiment.

Next, the pedestal 8 is inserted between the rotor 54 of the turbine and the bearing stand 2 as shown in FIG. 5.

Figure 6:
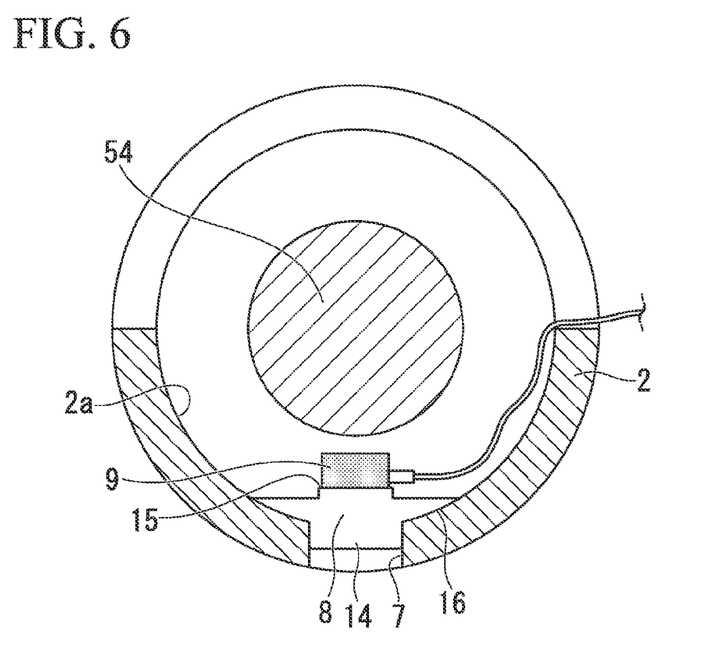
FIG. 6 is a view illustrating the rotor lifting method by means of the jig of the embodiment.

Then, as shown in FIG. 6, the protrusion 14 of the pedestal 8 is engaged in the oil drain port 7 of the bearing stand 2 to fix the pedestal 8. At this point, the curved seating surface 16 of the pedestal 8 and the inner peripheral surface 2a of the bearing stand 2 are in surface contact with each other.

Thereafter, the jack part 9 is placed on the jack mounting surface 15.

Figure 7:
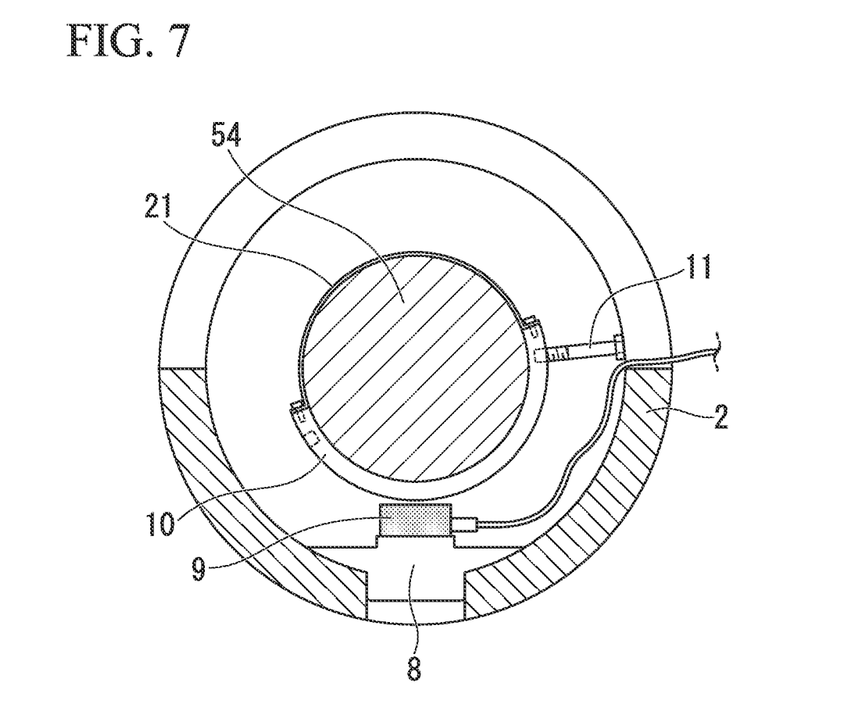
FIG. 7 is a view illustrating the rotor lifting method by means of the jig of the embodiment.

Next, as shown in FIG. 7, the rotor receiver 10 and the fall prevention plate 21 are mounted on the rotor 54.

Then, the two support members 11 are mounted on the rotor receiver 10. In this step, the support members 11 are mounted by slightly turning the rotor receiver 10 in order to avoid interference between the support members 11 and the bearing stand 2. FIG. 7 shows a state where a first support member 11 is mounted.

Finally, as shown in FIG. 3, the support members 11 are adjusted so as to eliminate the clearance between the heads of the support members 11, which are hexagon bolts, and the inner peripheral surface 2a of the bearing stand 2.

Thus, preparation for jacking up the rotor 54 has been completed.

To dismount the journal bearing 3, the jack part 9 is activated and the rotor 54 is suspended off the journal bearing 3. That is, loads applied to the journal bearing 3 are removed by suspending the rotor 54. Then, after the journal bearing 3 is moved toward the end portion of the rotor 54 by a predetermined method, the journal bearing 3 is moved from the position of the bearing cover part 6 by means of an overhead crane etc.

According to the embodiment described above, it is possible to configure a jig for lifting the rotor 54, including a backup structure for fall prevention during jack-up, in a simplified configuration. Since the single jack part 9 is used, the work efficiency during jack-up can also be improved.

In addition, since the jig is easy to mount to/remove from the clearance S between the rotor 54 and the lower half part of the bearing stand 2, the jig can be installed or dismantled quickly, as well as the time required for dismounting the journal bearing 3 is reduced during emergency inspection of the journal bearing 3 etc.

Since the support members 11 are provided on both sides of the jack part 9, the rotor receiver 10 for fall prevention during jack-up can be supported stably.

Since the pedestal 8 is provided with the curved surface having a part of the cylindrical surface conforming to the inner peripheral surface 2a of the bearing stand 2, the pedestal 8 can be supported stably by the bearing stand 2.

Since the pedestal 8 is provided with the protrusion 14 which engages with the oil drain port 7 provided at the bottom of the bearing stand 2, the stability of the pedestal 8 can be enhanced.

Since the radial dimension of the pedestal 8 is smaller than the radial clearance between the rotor 54 and the bearing stand 2, the pedestal 8 can be inserted into the clearance.

It is also possible to insert the pedestal 8, the jack part 9, the rotor receiver 10, and the support members 11 from the peripheral direction of the rotor 54. Accordingly, as the state of mounting or the state of removal can be visually checked while these components are being inserted from the peripheral direction, the operation can be performed safely and correctly.

Since the fall prevention plate 21 is provided to fix the outer periphery of the rotor 54 by the fall prevention plate 21 and the rotor receiver 10, the rotor 54 can be prevented from falling, for example, in the event of a failure in the jack part 9.

Since the inner peripheral surface of the rotor receiver 10 is a cylindrical surface which follows the contour of the rotor 54, the rotor receiver 10 is compact when inserted and can be inserted into even a narrow space.

Since the turnbuckle 22 is provided, the pedestal 8 can be fixed stably.

Since the jack part 9 which is a hydraulic cylinder is used, the efficiency of the jack-up work is high.

The technical scope of the present invention is not limited to the above-described embodiment, and various changes can be made within the scope of the present invention. A configuration arbitrarily combining the features described in the embodiment may be adopted.

In the above embodiment, hexagon bolts are used as the support members 11. For example, the heads of the hexagon bolts may be processed into a spherical shape so that the heads of the hexagon bolts and the inner peripheral surface 2a of the bearing stand 2 are butted against each other smoothly.

In addition, the support members 11 may be disposed in the radial direction of the rotational axis of the rotor 54, and in that case the rotor 54 can be effectively backed up so as not to fall.

Moreover, a spacer corresponding to the dimension between the inner peripheral surface 2a of the bearing stand 2 and the outer peripheral surface of the rotor receiver 10 may be adopted as the support member 11, and the rotor receiver 10 may be supported by inserting this spacer between the rotor receiver 10 and the bearing stand 2. The spacer is easy to insert and can be disposed more easily The number of the support members 11 is not limited to two but may be three or larger.

REFERENCE SIGNS LIST

1 Jig
2 Bearing stand
3 Journal bearing
4 Bearing stand main body part
5 Bearing stand sealing part
6 Bearing cover part
7 Oil drain port (opening)
8 Pedestal
9 Jack part
10 Rotor receiver
11 Support member
13 Pedestal main body part
14 Protrusion
15 Jack mounting surface
16 Curved seating surface
18 Hydraulic hose
19 Cylindrical surface
20 Screw hole
21 Fall prevention plate
22 Turnbuckle
23 Butting part
24 Turnbuckle main body part
50 Gas turbine
54 Rotor (rotating shaft)
60 Combustor
61 Turbine (rotary machine)

The invention claimed is:

1. A rotating shaft lifting jig which is inserted between a rotating shaft of a rotary machine and a bearing stand surrounding an outer periphery of at least a lower part of the rotating shaft, the rotating shaft lifting jig comprising: a pedestal which is supported on an inner peripheral surface of the bearing stand under the rotating shaft; a rotor receiver, an inner peripheral surface of which is formed so as to conform to an outer peripheral surface of the rotating shaft, and which covers the outer periphery of the rotating shaft on a lower side by extending in a peripheral direction of the rotating shaft; a jack part which is disposed between the pedestal and the rotor receiver, the jack part extends upward in a vertical direction to move the rotating shaft along with the rotor receiver upward in the vertical direction: a plurality of support members which are interposed between the rotor receiver and the bearing stand, the support members extending in radial directions of the rotating shaft, and the support members support the rotor receiver against the bearing stand from directions different from the vertical direction and the radial directions are different from one another.

2. The rotating shaft lifting jig according to claim 1, wherein the plurality of support members are disposed with the jack part being interposed therebetween in the peripheral direction of the rotating shaft.

3. The rotating shaft lifting jig according to claim 1, wherein the pedestal has a curved surface having part of a cylindrical surface conforming to the inner peripheral surface of the bearing stand.

4. The rotating shaft lifting jig according to claim 1, wherein the bearing stand has an opening at a bottom of the bearing stand, and the pedestal is provided with a protrusion which projects downward and engages with the opening.

5. A rotating shaft lifting method for lifting a rotating shaft of a rotary machine by means of a jig which is inserted between the rotating shaft and a bearing stand surrounding an outer periphery of at least a lower part of the rotating shaft, the rotating shaft lifting method comprising the steps of: fixing a pedestal, of which a radial dimension is smaller than a radial clearance between the rotating shaft and the bearing stand, between the rotating shaft and the bearing stand so as to be supported on the bearing stand; mounting a jack part, which extends upward in a vertical direction and lifts the rotating shaft from below, on the pedestal; mounting a rotor receiver between the jack part and the rotating shaft, the rotor receiver having a cylindrical surface conforming to an outer peripheral surface of the rotating shaft; providing the rotor receiver with a plurality of support members extending in radial directions of the rotating shaft, the radial directions being different from the vertical direction in which the jack part extends, and the radial directions being different from one another, wherein the plurality of support members are interposed between the rotor receiver and the bearing stand; and activating the jack part and extending the jack part upward in the vertical direction.

6. The rotating shaft lifting jig according to claim 1, wherein an inner surface of at least a lower half part of the bearing stand has a cylindrical shape concentric with the rotating shaft.

7. The rotating shaft lifting jig according to claim 1, wherein the rotor receiver is a semi-annular member which covers the outer periphery of the rotating shaft on the lower side in close contact with the rotating shaft.

8. The rotating shaft lifting jig according to claim 1, wherein the rotor receiver has a cylindrical surface that butts against an outer peripheral surface of the lower part of the rotating shaft, and a plurality of screw holes in which the plurality of support members are capable of being fixed.

9. The rotating shaft lifting jig according to claim 1, wherein the pedestal has a pedestal main body part which is placed on the inner peripheral surface of the bearing stand, and the pedestal main body part has a shape of a block with a flat jack mounting surface and a curved seating surface which is formed of a curved surface having a part of a cylindrical surface conforming to the inner peripheral surface of the bearing stand.

10. The rotating shaft lifting jig according to claim 4 further comprising a turnbuckle having a pair of butting parts at both ends and that is capable of adjusting a distance between the pair of butting parts, wherein the pair of butting parts is each in contact with the protrusion of the pedestal and the opening of the bearing stand.

11. The rotating shaft lifting jig according to claim 3, wherein an inner surface of at least a lower half part of the bearing stand has a cylindrical shape concentric with the rotating shaft.

12. The rotating shaft lifting jig according to claim 3, wherein the rotor receiver is a semi-annular member which covers the outer periphery of the rotating shaft on the lower side in close contact with the rotating shaft.

13. The rotating shaft lifting jig according to claim 6, wherein the rotor receiver is a semi-annular member which covers the outer periphery of the rotating shaft on the lower side in close contact with the rotating shaft.

14. The rotating shaft lifting jig according to claim 6, wherein the pedestal has a pedestal main body part which is placed on the inner peripheral surface of the bearing stand, and the pedestal main body part has a shape of a block with a flat jack mounting surface and a curved seating surface which is formed of a curved surface having a part of a cylindrical surface conforming to the inner peripheral surface of the bearing stand.

15. The rotating shaft lifting method according to claim 5, wherein in a step of providing the plurality of support members, the plurality of support members are disposed with the jack part being interposed therebetween in a peripheral direction of the rotating shaft.

16. The rotating shaft lifting method according to claim 5, wherein an inner surface of at least a lower half part of the bearing stand has a cylindrical shape concentric with the rotating shaft, and the pedestal has a curved surface having part of a cylindrical surface conforming to an inner peripheral surface of the bearing stand, and wherein the method further comprises a step of fixing the pedestal on the inner peripheral surface of the bearing stand so as to be supported on the bearing stand.

17. The rotating shaft lifting method according to claim 5, further comprising a step of covering the outer periphery of the rotating shaft on a lower side in close contact with the rotating shaft by the rotor receiver that is a semi-annular member.

18. The rotating shaft lifting method according to claim 5, wherein the rotor receiver has a cylindrical surface that butts against an outer peripheral surface of the lower part of the rotating shaft, and the rotor receiver includes a plurality of screw holes in which the plurality of support members are capable of being fixed, and wherein the method further comprises the step of fixing each of the plurality of support members in the plurality of screw holes, respectively, to dispose the plurality of support members between the rotor receiver and the bearing stand.

19. The rotating shaft lifting method according to claim 5, wherein the pedestal has a pedestal main body part which is placed on an inner peripheral surface of the bearing stand, and the pedestal main body part has a shape of a block with a flat jack mounting surface and a curved seating surface which is formed of a curved surface having a part of a cylindrical surface conforming to the inner peripheral surface of the bearing stand, and wherein the method further comprises the steps of: mounting the jack part on the flat jack mounting surface of the pedestal main body part, and placing the curved seating surface of the pedestal main body part on the inner peripheral surface of the bearing stand.

20. The rotating shaft lifting method according to claim 15, wherein an inner surface of at least a lower half part of the bearing stand has a cylindrical shape concentric with the rotating shaft, and the pedestal has a curved surface having part of a cylindrical surface conforming to an inner peripheral surface of the bearing stand, and wherein the method further comprises the step of fixing the pedestal on an inner peripheral surface of the bearing stand so as to be supported on the bearing stand.

* * * * *